J. A. AYRES.
Oscillating Water-Meters.

No. 210,898. Patented Dec. 17, 1878.

Witnesses:
William H. Potter
Henry W. Ayres

Inventor:
Jared A. Ayres.

UNITED STATES PATENT OFFICE.

JARED A. AYRES, OF MYSTIC RIVER, CONNECTICUT.

IMPROVEMENT IN OSCILLATING WATER-METERS.

Specification forming part of Letters Patent No. 210,898, dated December 17, 1878; application filed July 17, 1878.

*To all whom it may concern:*

Be it known that I, JARED A. AYRES, of Mystic River, in the county of New London and State of Connecticut, have invented certain new and useful Improvements in Water-Meters; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

The object of my invention is to maintain an undiminished supply of air in the air-chamber of a water-meter wherein the water is measured, while making the meter so small in compass and weight that it may be economical to build and easily handled, and the measuring-bucket also so small that it will not jar or wear itself out.

My invention consists in scattering the flowing water into spray within the meter in order to free the air with which it is charged to constantly re-enforce the air body within the case and replace loss by leakage or otherwise.

It also consists in dividing the stream of water within the meter into a number of lesser streams, measuring one of these streams, and scattering the rest into spray.

Figure 1:
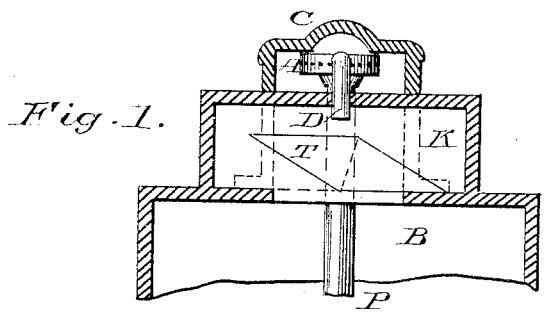
Figure 2:
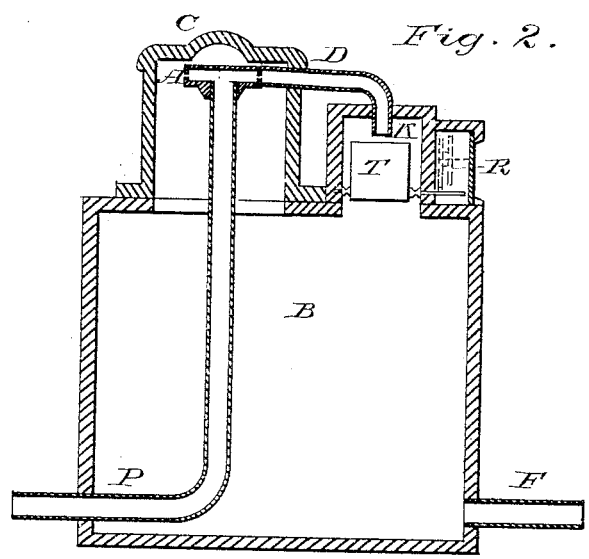
Figure 3:
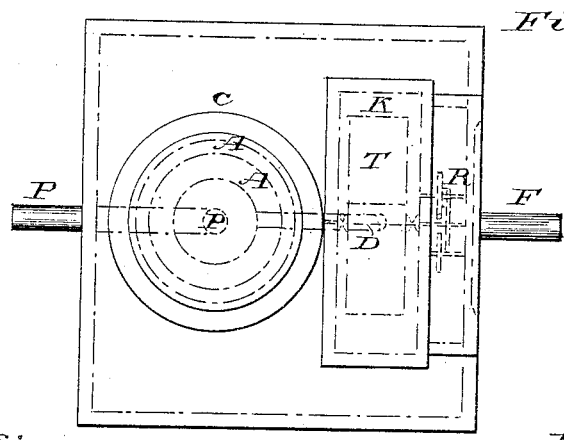

In the accompanying drawings, Figure 1 is a vertical section through the upper part of the meter, showing, especially, the dome, within which the stream of water is separated into its uniform parts, and the measuring-bucket. Fig. 2 is a vertical section through the meter at right angles to that of Fig. 1. Fig. 3 is a horizontal plan of the meter.

B is the meter-chest—a plain box or cylinder, of size simply sufficient—acting as an air-chamber to hold the water in equilibrium below the level of the axis of the measuring-bucket T. P is the induction-pipe, rising through the chest B to the top of the dome C, where it terminates in the cap A. A is a round cap, of brass or suitable metal, with a diameter about three times that of the pipe P, and shallow, perforated in its horizontal plane with a number of small holes, uniform in size, at equal distances from each other, that they may be in the same condition in respect to the pressure, friction, currents, &c., of the water forcing its way through them when the meter is in operation. These apertures are large enough to prevent any clogging or variation from impurities in the water, are made through thin metal, so as not to have any considerable cylindrical length, and the rapid motion of the water inside of the cap A keeps them clean and uniform in delivery.

D is a pipe or channel fitted to cover one of the apertures in the cap A, and of sufficient capacity to convey freely the water discharged into and through it till it falls into the upper side of the measuring-bucket T, as shown in Fig. 2. T is a measuring-bucket, made in the shape of a trapezoid, open at top, with a division from the axis to the corresponding opposite angle. It is thus divided into two equal compartments, to be alternately filled by the stream of water falling into them through the pipe or channel D.

C is a cylindrical case or dome, covering in the cap A in the smallest convenient space, and standing on the top of the meter-box B, to which it is properly secured. K is a small box, covering in, for like purpose and in like manner, the measuring-bucket T. R is a common registering apparatus, attached to the axis of the measuring-bucket T. F is the pipe through which the water flows out of the meter to its point of delivery.

The operation of my invention is as follows: When the meter is connected with the service-pipe of a water-supply system, the water enters and rises through P, is driven out through the apertures in the cap A with a velocity corresponding to its passage through the pipe P, and dashes with force against the sides of the dome C, scattering itself in spray, and separating itself very completely from the air with which it was charged on entering the pipe P. The water falls into the meter-box B, rising in it until it reaches a point where the pressure of the water and of the air which it has compressed in the meter-box are in equilibrium, when the water ceases to flow in through the apertures in the cap A. According to the water-head, the water will now stand in B at some point below the bottom of the measuring-bucket T. The air, as it is freed from the flowing water, re-enforces the air-cushion in the meter-case, replacing loss from leakage, absorption, or any cause, and insuring the measuring-buckets against interference by the encroachment of the water. While the water has been discharging through the apertures in A and filling the meter-box B, one of the streams through these apertures has taken the roundabout course through the pipe D, has emptied itself into the measuring-bucket T, and been discharged by its oscillation, falling, like the others, into the meter-box B. This oscillation has moved the registering apparatus R appropriately forward, and indicated the fractional part of the water which has entered the meter.

I claim for my invention—

1. The method of maintaining an undiminished air-supply in the air-chamber of a water-meter, consisting in scattering the water into spray within the meter, in order to separate and utilize the air with which it is mingled as it enters.

2. The method of measuring water flowing in service-pipes, consisting in dividing the stream of water in the air-chamber of a meter into a number of equal or equivalent streams, measuring one of these streams, and scattering the remainder in spray to maintain the air-volume, substantially as described.

3. In a water-meter, the combination, with the induction-pipe, of a spraying apparatus within the case, substantially as described.

4. In a water-meter, the combination, with the induction-pipe, of a perforated head or cap and a dome, against which the water is dashed and scattered in spray.

5. In a water-meter, the combination of the induction-pipe P, the perforated head or cap A, the spraying-dome C, the measuring-bucket T, and the registering apparatus.

JARED A. AYRES.

Witnesses:
 WILLIAM H. POTTER,
 HENRY W. AYRES.